No. 674,346. Patented May 14, 1901.
E. N. TRUMP.
CONVEYING APPARATUS.
(Application filed Jan. 18, 1896.)

(No Model.) 10 Sheets—Sheet I.

WITNESSES
H. C. Chase
N. H. Theobald

INVENTOR
Edward N. Trump
BY
Hey & Parsons
ATTORNEYS

No. 674,346. Patented May 14, 1901.
E. N. TRUMP.
CONVEYING APPARATUS.
(Application filed Jan. 18, 1896.)

(No Model.) 10 Sheets—Sheet 2.

WITNESSES:

INVENTOR
Edward N. Trump.

BY

ATTORNEYS.

No. 674,346. Patented May 14, 1901.
E. N. TRUMP.
CONVEYING APPARATUS.
(Application filed Jan. 18, 1896.)

(No Model.) 10 Sheets—Sheet 3.

WITNESSES:

INVENTOR
Edward N. Trump,
BY
ATTORNEYS

No. 674,346. Patented May 14, 1901.
E. N. TRUMP.
CONVEYING APPARATUS.
(Application filed Jan. 18, 1896.)
(No Model.) 10 Sheets—Sheet 4.

WITNESSES:

INVENTOR

BY

ATTORNEYS.

No. 674,346. Patented May 14, 1901.
E. N. TRUMP.
CONVEYING APPARATUS.
(Application filed Jan. 18, 1896.)
(No Model.) 10 Sheets—Sheet 5.

WITNESSES:

INVENTOR
Edward N. Trump,
BY
ATTORNEYS,

No. 674,346. Patented May 14, 1901.
E. N. TRUMP.
CONVEYING APPARATUS.
(Application filed Jan. 18, 1896.)
(No Model.) 10 Sheets—Sheet 6.

WITNESSES:

INVENTOR
Edward N. Trump,
BY
ATTORNEYS.

No. 674,346. Patented May 14, 1901.
E. N. TRUMP.
CONVEYING APPARATUS.
(Application filed Jan. 18, 1896.)

(No Model.) 10 Sheets—Sheet 7.

WITNESSES
INVENTOR
Edward N. Trump
BY
ATTORNEYS

No. 674,346. Patented May 14, 1901.
E. N. TRUMP.
CONVEYING APPARATUS.
(Application filed Jan. 18, 1896.)
(No Model.) 10 Sheets—Sheet 8.

WITNESSES:

INVENTOR
Edward N. Trump.
BY
ATTORNEYS

No. 674,346. Patented May 14, 1901.
E. N. TRUMP.
CONVEYING APPARATUS.
(Application filed Jan. 18, 1896.)
(No Model.) 10 Sheets—Sheet 9.

WITNESSES:

INVENTOR
Edward N. Trump,
BY
ATTORNEYS.

No. 674,346. Patented May 14, 1901.
E. N. TRUMP.
CONVEYING APPARATUS.
(Application filed Jan. 18, 1896.)
(No Model.) 10 Sheets—Sheet 10.

WITNESSES
INVENTOR
Edward N. Trump.
BY
ATTORNEYS.

UNITED STATES PATENT OFFICE.

EDWARD NEEDLES TRUMP, OF SYRACUSE, NEW YORK, ASSIGNOR TO THE SOLVAY PROCESS CO., OF SAME PLACE.

CONVEYING APPARATUS.

SPECIFICATION forming part of Letters Patent No. 674,346, dated May 14, 1901.

Application filed January 18, 1896. Serial No. 576,031. (No model.)

*To all whom it may concern:*

Be it known that I, EDWARD NEEDLES TRUMP, of Syracuse, in the county of Onondaga, in the State of New York, have invented new and useful Improvements in Conveying Apparatus, of which the following, taken in connection with the accompanying drawings, is a full, clear, and exact description.

My invention relates to conveying apparatus, and has for its object the production of a device which is capable of feeding material in different paths of various lengths, and is particularly applicable for cooling or otherwise changing or manipulating the same; and to this end it consists, essentially, in the combination, construction, and arrangement of the component parts of a conveying apparatus, as hereinafter fully described, and pointed out in the claims.

In describing this invention reference is had to the accompanying drawings, forming part of this specification, in which like letters indicate corresponding parts in all the views.

Fig. 3 is a top plan of the parts as seen in Fig. 2, additional portions of the conveyer elements being broken away and parts of the driving mechanism and supporting-frame being removed. Fig. 16 is a transverse vertical section of a modified construction of my invention.

A A are conveyer elements arranged end to end; A' A', additional conveyer elements, also arranged end to end and disposed substantially parallel with the conveyer elements A A and substantially side by side therewith; B B, casings communicating with said conveyer elements and receiving mechanism for determining the paths of the material to be conveyed, and C a suitable supporting-frame. A cooling-chamber D, mounted on the frame C, preferably incloses the foregoing parts, but may be omitted, if desired, and suitable driving mechanism is connected to the conveyer elements A A' for independently revolving the same in order that any desired number of conveyer elements may be revolved or allowed to remain inoperative or stationary. As here illustrated the conveyer elements A A' are provided with peripheral gears or toothed faces $a$ $a'$, and said driving mechanism consists of pinions $e$ $e'$, meshing therewith, and means for actuating the pinions.

For the purpose of simplifying the illustration and description of my invention I have shown a main shaft $e^2$, driven by a belt $e^3$, as connected to rotate the contiguous ends of two adjacent pairs of the conveyer elements A A'. The shaft $e^2$ is connected by suitable pulleys and a twisted belt $e^4$ to a supplemental shaft $e^5$, and said shafts $e^2$ $e^5$ are provided with pulleys connected by belts $e^6$ $e^7$ to pulleys $e^8$ $e^9$, mounted on shafts $e^{10}$ $e^{11}$. The opposite ends of the shafts $e^{10}$ $e^{11}$ are provided with bevel-gears $e^{12}$, meshing with bevel-gears $e^{13}$, provided upon shafts $e^{14}$ $e^{15}$, upon which the pinions $e$ $e'$, previously referred to, are mounted.

The connections just described between the pinions $e$ $e'$ and the shaft $e^2$ operate to simultaneously revolve the contiguous ends of the conveyer elements A A', adjacent thereto, in the directions indicated by arrows 1 and 2, Figs. 1, 2, 3, and 7, and when it is desirable to permit one or more of these conveyer elements to remain inoperative or stationary one or more of the bevel-gears $e^{12}$ may be detached from the shafts $e^{10}$ $e^{11}$ or the bevel-gears $e^{13}$, and either or both of the belts $e^6$ $e^7$ may be forced from operative position. The described mechanism for driving or revolving the conveyer elements A A' forms no part of my present invention, and it will be understood that any suitable mechanism may be used for this purpose which is capable of effecting the desired operation of the conveyer element or of permitting one or more of the conveyer elements to remain inoperative or stationary.

In order to reduce to a minimum the friction incidental to the revolution of the conveyer elements A A', tires $a^3$ are provided thereon and are engaged by supporting anti-friction-rollers $f$. Said tires and rollers form no part of my present invention, and hence it is unnecessary to describe the same.

Figure 7:
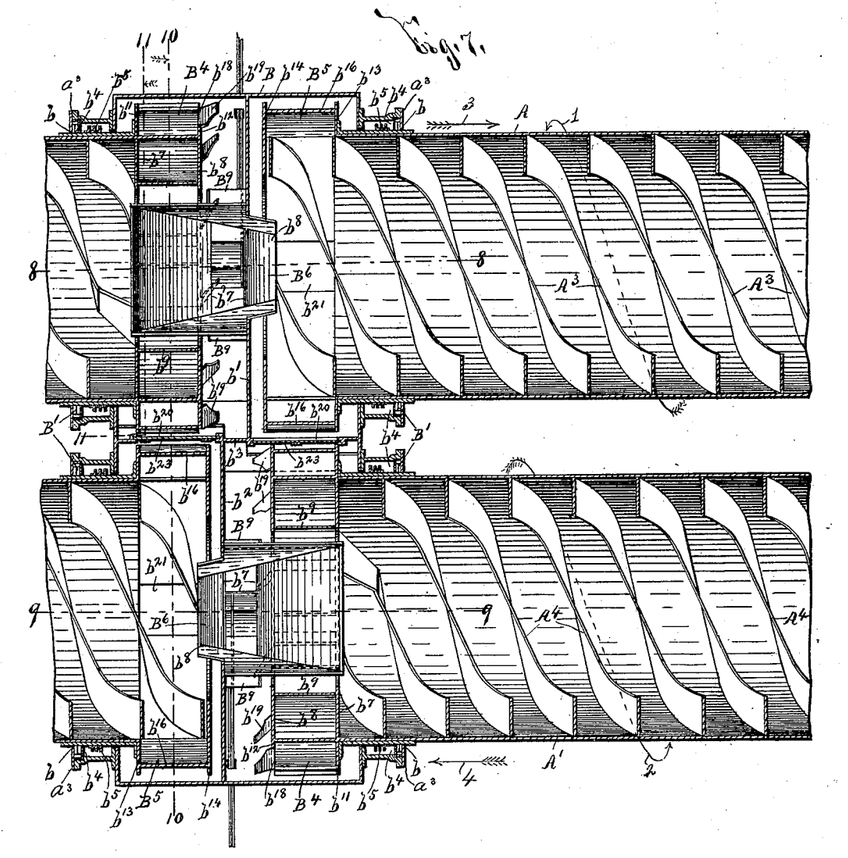
Figure 8:
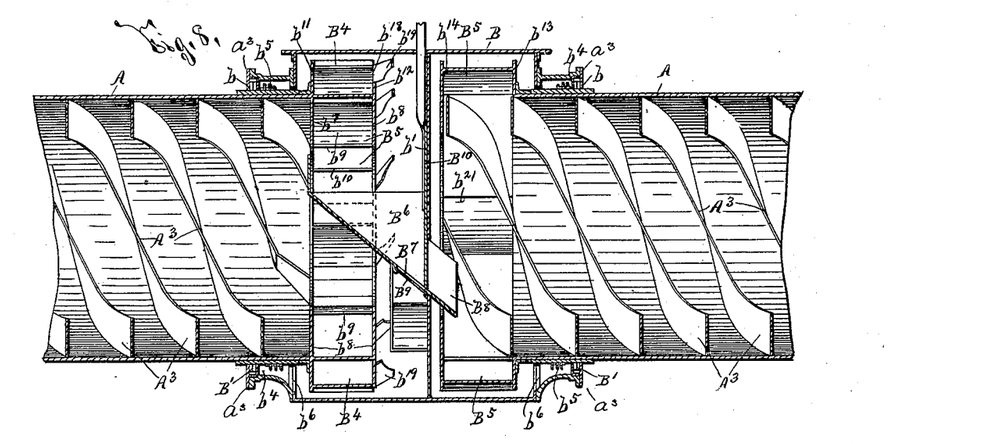
Figs. 8 and 9 are longitudinal vertical sections taken, respectively, on lines 8 8 and 9 9, Fig. 7.
Figure 9:
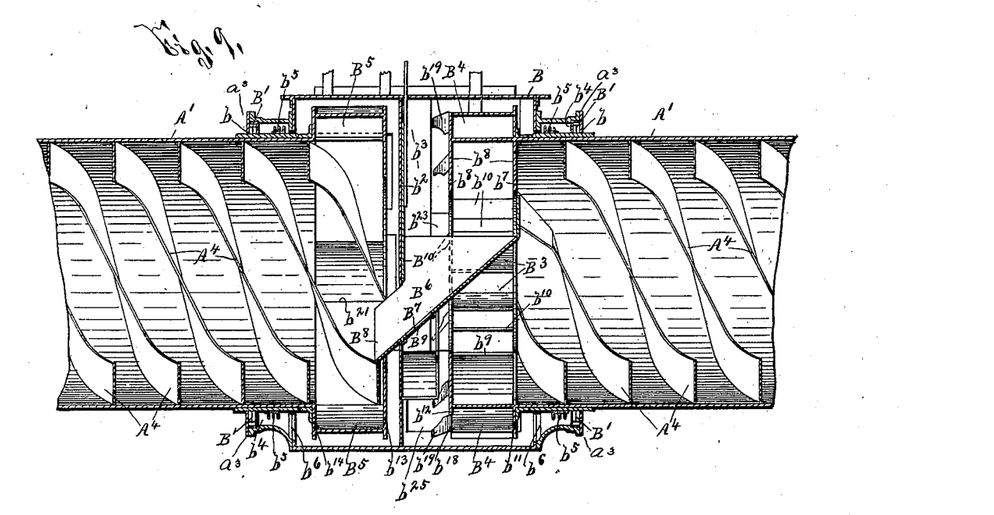

The conveyer elements A A' usually consist of lengthwise cylinders provided on their interior with suitable means, as spirally-arranged conveyer-blades $A^3$ $A^4$, for feeding or moving the material lengthwise in one direction in the conveyer elements A and lengthwise in an opposite direction in the conveyer elements A', as indicated by arrows 3 and 4, Fig. 7. As previously stated, the conveyer elements A A' are preferably revolved in opposite directions, and consequently the spirally-arranged blades $A^3$ $A^4$ incline in the same direction; but it is apparent that if the conveyer elements are revolved in the same direction the blades $A^3$ $A^4$ will incline in opposite directions.

The casings B generally connect the conveyer elements A A' at intervals, are of any desirable form, size, and construction suitable for communicating with said conveyer elements and permitting the operation of the contiguous transfer mechanism presently described, and are here shown as entirely inclosing contiguous ends of the conveyer elements, as provided with openings $b$ in their side walls for receiving said ends of the conveyer elements, and as subdivided into four compartments by transverse and longitudinal partitions $b'$ $b^2$ $b^3$. The side walls of the casings B are preferably provided with projecting chambers or stuffing-boxes $b^4$, encircling the conveyer elements and extending toward annular flanges $a^3$ on the conveyer elements beyond the casings B. Said chambers or stuffing-boxes $b^4$ receive dust-proof or packing rings B', which surround the contiguous portions of the conveyer elements, are composed of wood or other suitable material, and are interposed between said annular flanges $a^3$ on the conveyer elements and contiguous surfaces of the chambers or stuffing-boxes $b^4$.

The rings B' usually consist of arc-shaped sections, which are arranged with their adjacent ends tapered and lapped upon each other, and are each provided with springs $B^2$ for effecting independent adjustment of said sections. The springs $B^2$ are here shown as arranged between the inner faces of the chambers or stuffing-boxes $b^4$ and the peripheral faces of the rings B'. The construction of said packing-rings is not a feature of my present invention, and it is therefore unnecessary to additionally describe the same. I also generally arrange within the chambers or stuffing-boxes $b^4$ suitable means for feeding the material from the packing-rings B' and the openings $b$. This means is here shown as consisting of helical flanges or shoulders $b^5$, encircling the conveyer elements A A' and fixed thereto. The material which tends to pass outwardly from the casings B through the chambers or stuffing-boxes $b^4$ is forced backwardly by these helical flanges or shoulders and is returned to the bases of the casings B through openings $b^6$ in the lower inner sides of the chambers or stuffing-boxes $b^4$. Said means for feeding the material from the packing-rings B' and the openings $b$ forms no part of my present invention, and hence it is unnecessary to further describe the same herein.

The mechanism within the casings B for controlling the paths of the material to be conveyed preferably consists of pockets $B^3$, pockets or scoops $B^4$ $B^5$, chutes $B^6$, passages or openings in the walls of the casings and chutes, and closures, as gates or doors, for opening and closing these passages or openings or directing the material therethrough. Of said mechanism within the casings the parts $B^3$ $B^4$ $B^5$ $B^6$ form transfer mechanism, and the passages or openings and the closures form means for controlling the operation of the transfer mechanism without varying the rotation of the conveyer elements. Said casings, transfer mechanism, and controlling means form stations which connect the conveyer elements and are usually of such construction that they receive the material from either of the conveyer elements feeding thereinto, transfer the material to either of the conveyer elements feeding therefrom, receive the material from an outside source, and conduct the material received from an outside source to either of the conveyer elements feeding therefrom, or discharge the same without feeding it to said conveyer elements.

Figure 11:
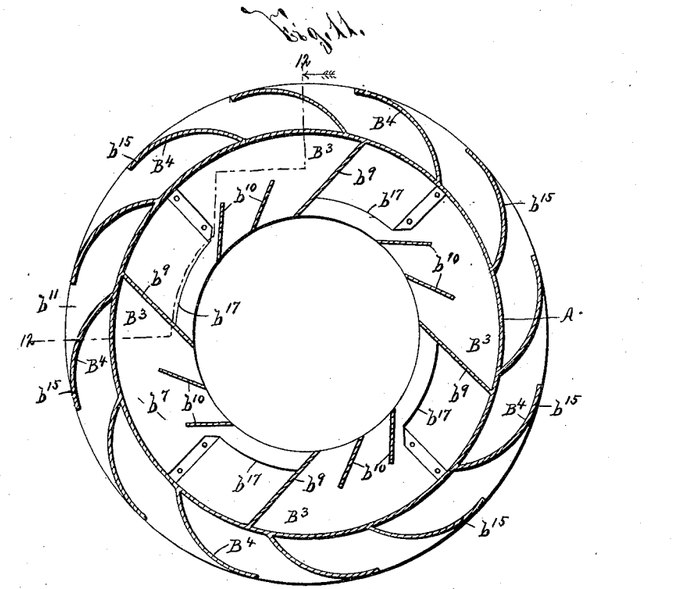
Figure 12:
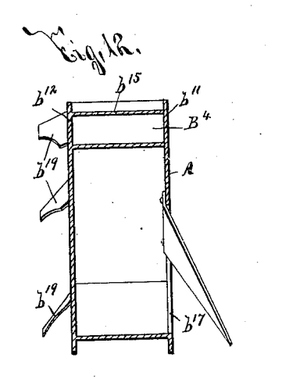
Figs. 12 and 13 are detail vertical sections taken, respectively, on lines 12 12, Fig. 11, and 13 13, Fig. 10.
Figure 13:
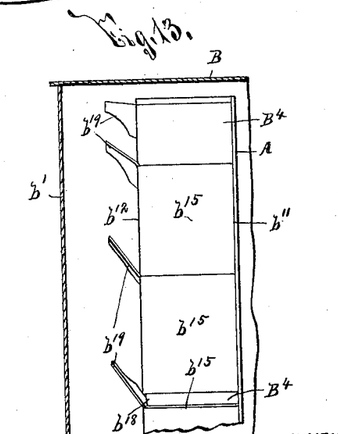
Figure 14:
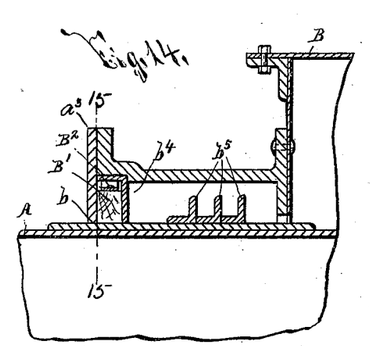
Fig. 14 is an enlarged longitudinal vertical section of portions of one of the casings, the end of a conveyer element arranged therein, the dust-proof or packing ring for said conveyer element, and the means for feeding the material from the dust-proof or packing ring and the opening in the adjacent side wall of said casing.
Figure 15:
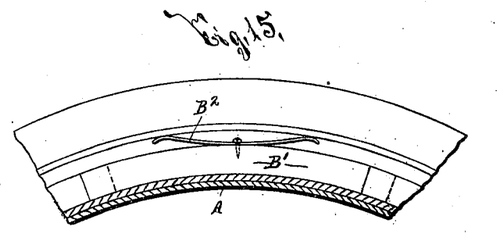
Fig. 15 is a detail vertical section taken on line 15 15, Fig. 14.
Figure 19:
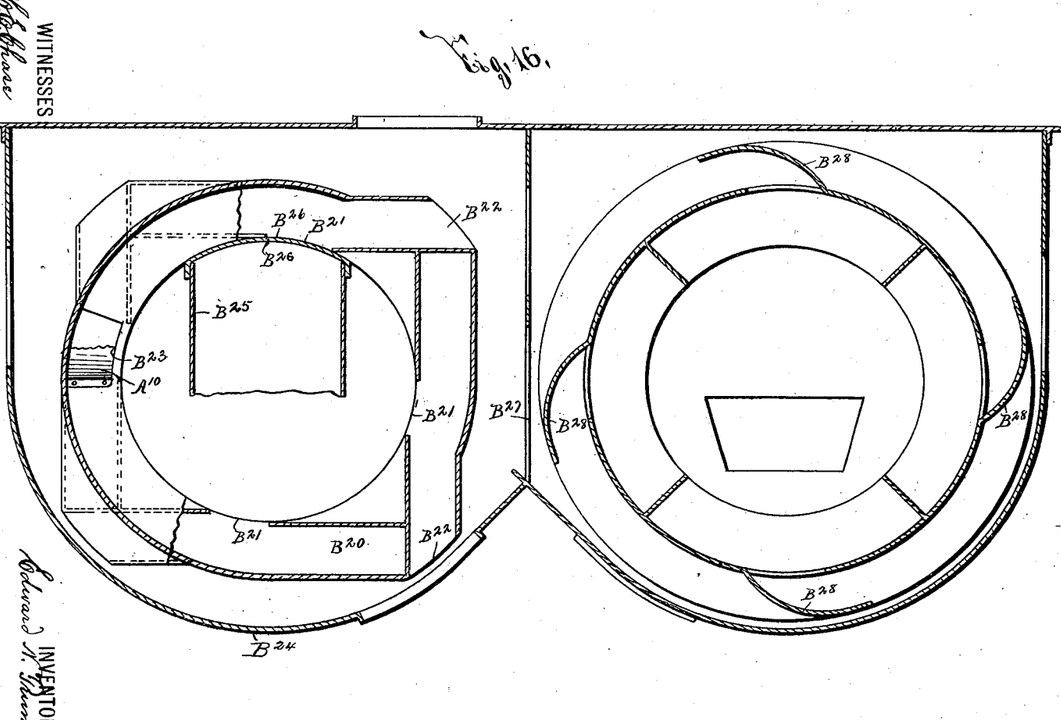

The pockets $B^3$ receive and discharge the material fed by the conveyer-blades $A^3$ $A^4$ and are shown as tangentially arranged within the interiors of the discharging ends of the conveyer elements A A', feeding to the casings B, and at the terminations of said conveyer-blades. The bottoms of the pockets $B^3$ are generally formed by the inner faces of the inclosing walls or shells of the conveyer elements provided therewith, and the sides of said pockets are formed by separated annular flanges or shoulders $b^7$ $b^8$, projecting from the inner faces of the discharging ends of said conveyer elements. The inner sides of said pockets $B^3$ are formed by cross plates or bars $b^9$, inclining from said inner faces of the discharging ends of the conveyer elements A A' in the direction of movement of said elements. I also usually arrange between the flanges or shoulders $b^7 b^8$, within the spaces interposed between the inner or advance ends of the cross plates or bars $b^9$, additional cross plates or bars $b^{10}$, similarly inclined and formed of less width than the cross plates or bars $b^9$. The flanges or shoulders $b^8$ project inwardly from the corresponding ends of the conveyer elements, and the flanges or shoulders $b^7$ are arranged within said ends at the terminations of the corresponding conveyer-blades and are formed with openings $b^{17}$, Figs. 11 and 12, one for each pocket $B^3$, for permitting the material conveyed by the blades $A^3 A^4$ to pass into the pockets $B^3$ as it leaves said conveyer-blades. The material admitted to the pockets $B^3$ remains therein until said pockets have been elevated to substantially the tops of the conveyer elements by the rotation thereof, whereupon said material falls by gravity toward the axes of said conveyer elements.

Figure 10:
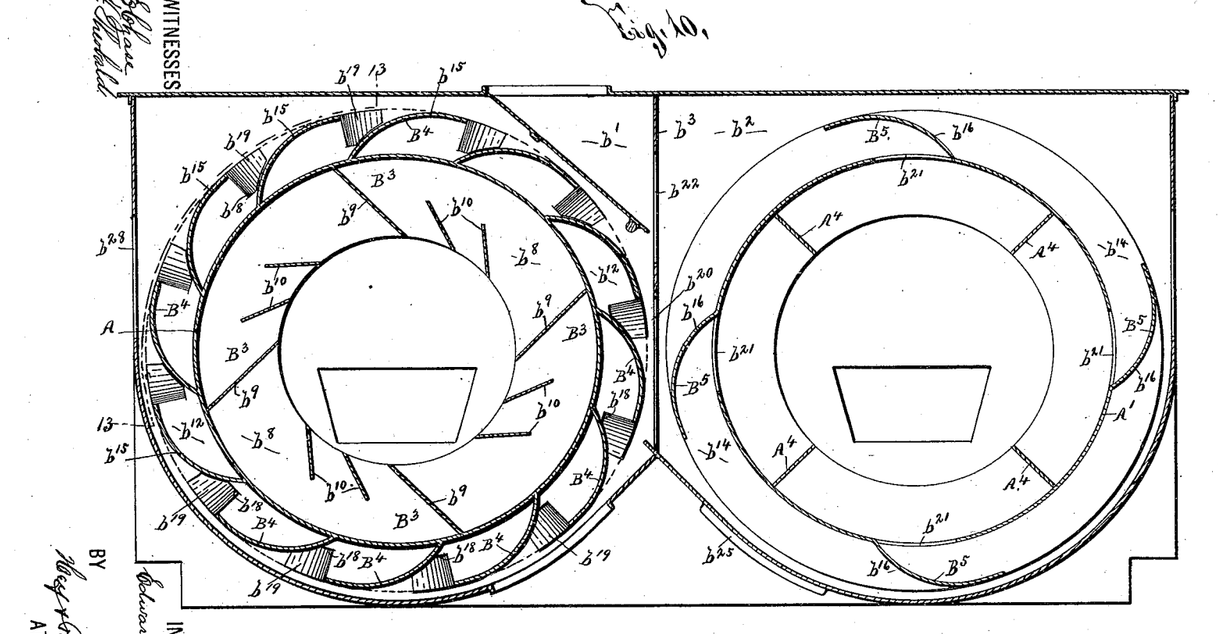
Figs. 10 and 11 are transverse vertical sections looking in opposite directions and taken, respectively, on lines 10 10 and 11 11, Fig. 7.

The pockets or scoops $B^4 B^5$ are arranged, respectively, on the peripheries or exteriors of the discharging and receiving ends of the conveyer elements A A'. Said pockets or scoops are generally formed by the peripheral walls of the ends of the conveyer elements provided therewith and by separated annular flanges or shoulders $b^{11} b^{12} b^{13} b^{14}$, projecting from said peripheral walls, and crosswalls $b^{15} b^{16}$, extending from said peripheral walls in the direction of movement of the conveyer elements. The side walls of the pockets or scoops $B^4$ nearest the partitions $b' b^2$ are provided with openings $b^{18}$ and outwardly-deflected projections or arms $b^{19}$, inclining from the advance ends of the cross-walls $b^{15}$ in the direction of rotation of the conveyer elements provided with said pockets or scoops. As these conveyer elements are rotated the projections or arms $b^{19}$ deflect into the pockets or scoops $B^4$ any material fed into the bases of the casings B, as presently described. This material is then elevated by the pockets or scoops $B^4$ and discharged from openings in their advance ends through passages or openings $b^{20}$, Figs. 5 and 10, formed in the bases of the longitudinal partitions $b^3$. The pockets or scoops $B^5$ are provided with openings $b^{21}$ in their bases, and these openings $b^{21}$ form, essentially, openings in the inclosing shells or outer walls of the conveyer elements provided therewith and permit the material within the pockets or scoops $B^5$ when elevated to feed downwardly by gravity toward the axes of said conveyer elements. The openings $b^{21}$ communicate with the channels or spaces between the conveyer-blades, which preferably extend to the vertical planes of the outer edges of the pockets or scoops $B^5$, and consequently the material fed from these pockets or scoops within said conveyer elements is engaged by the conveyer-blades and fed onwardly out of the casings B.

The material which enters the pockets or scoops $B^5$ is fed to the bases of the casings B through the passages or openings $b^{20}$, previously described, or through additional passages or openings $b^{22}$, arranged above the left-hand passages or openings $b^{20}$ of said casings. The passages or openings $b^{20}$, previously mentioned, are closed by closures or gates $b^{23}$, actuated by any desirable means, as levers $b^{24}$, and the closures or gates for closing the left-hand passages or openings $b^{20}$ of said casings operate to close and open the passages or openings $b^{22}$ when said gates are elevated and depressed. The central portions of the bases of the casings B are usually provided with suitable outlet-openings arranged on opposite sides of the partitions $b^3$ in alinement with the pockets $B^4$, and these outlet-openings are closed by closures or doors $b^{25}$, operated by any suitable means, as rods $b^{26}$. Chutes $b^{27}$ receive the material discharged through the outlet-openings of the casings B and conduct the same downwardly to the desired locality.

The upper ends of the chutes $B^6$, previously mentioned, are arranged within the discharging ends of the conveyer elements provided with the pockets $B^3$, and their tops are formed with funnel-mouths, which are adjacent to said pockets $B^3$, for receiving the material discharged therefrom. These chutes project through annular openings in the flanges or shoulders $b^8$, incline downwardly through the transverse partitions $b' b^2$, and are provided with outlet-openings $B^7$ in their bottoms, which discharge the material into the compartments of the casings B, in which the pockets $B^3 B^4$ revolve, and with additional outlet-openings $B^8$, which discharge the material into the interiors of the receiving ends of the conveyer elements provided with the pockets or scoops $B^5$. Suitable closures, as gates $B^9 B^9$ and $B^{10}$, operate to open and close the outlet-openings $B^7 B^8$ and are actuated by any desirable mechanism, as levers $B^{11} B^{11}$ $B^{12}$, arranged at the outside of the casings B.

When the material is fed through the opening $B^7$ of one of the chutes $B^6$, the opening $B^8$ therein is preferably closed, although both of these openings may be partially open, if desired, for feeding part of the material in one direction and part in another. The material passing through the openings $B^7$ falls to the bases of the compartments in which the pockets $B^3 B^4$ revolve and is fed upwardly by the pockets or scoops $B^4$, as previously described, and discharged through the passages or openings $b^{20}$ into the compartments on the opposite sides of the partitions $b^3$. It is then elevated by the pockets or scoops $B^5$ and fed in an opposite direction by the conveyer elements provided with said pockets or scoops $B^5$. The material passing through the openings $B^8$ enters the interiors of the conveyer elements arranged end to end with the conveyer elements which have previously discharged said material into the chutes $B^6$, and is consequently fed onward in the same direction.

My invention when constructed as described is capable of feeding the material from opposite directions into the casings B and discharging the same therefrom to the outside of said casings—as, for instance, into the adjacent chutes $b^{27}$. It may also feed all or part of the material in one direction through one conveyer element, or transmit said material to the conveyer element arranged parallel therewith and feeding in an opposite direction, whence the material may be continuously fed through a number of similar conveyer elements, or may be returned through a second casing B to the opposite end of the conveyer element by which it was first fed onward or to the corresponding end of another conveyer element extending in the same continuous line and feeding in the same direction.

As thus far described the casings B are designed to connect the adjacent ends of four conveyer elements; but it will be obvious that a casing for connecting the adjacent ends of only two substantially parallel conveyer elements may be constructed, if desired, of about half the usual width of a casing for connecting four conveyer elements and will be provided with but one set of the pockets $B^3$ $B^4$ $B^5$ and one chute $B^6$. At the right-hand end of Fig. 1 I have shown in top plan a casing of this construction; but it is unnecessary to herein specifically illustrate and describe the same, as it is exactly identical with the casing previously described, with the exception of the differences pointed out. In practice, however, I generally use for connecting the adjacent ends of only two conveyer elements arranged parallel with each other a casing capable of connecting the adjacent ends of four conveyer elements, as then the system may be readily extended without necessitating change in the casings B and by merely inserting two additional conveyer elements into the unused side of such end casing.

Figure 1:
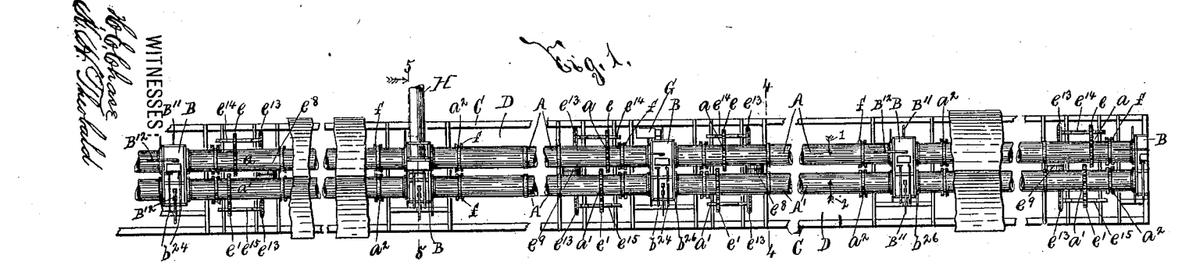
Figure 1 is a top plan, partly broken away, of portions of my conveying apparatus.
Figure 2:
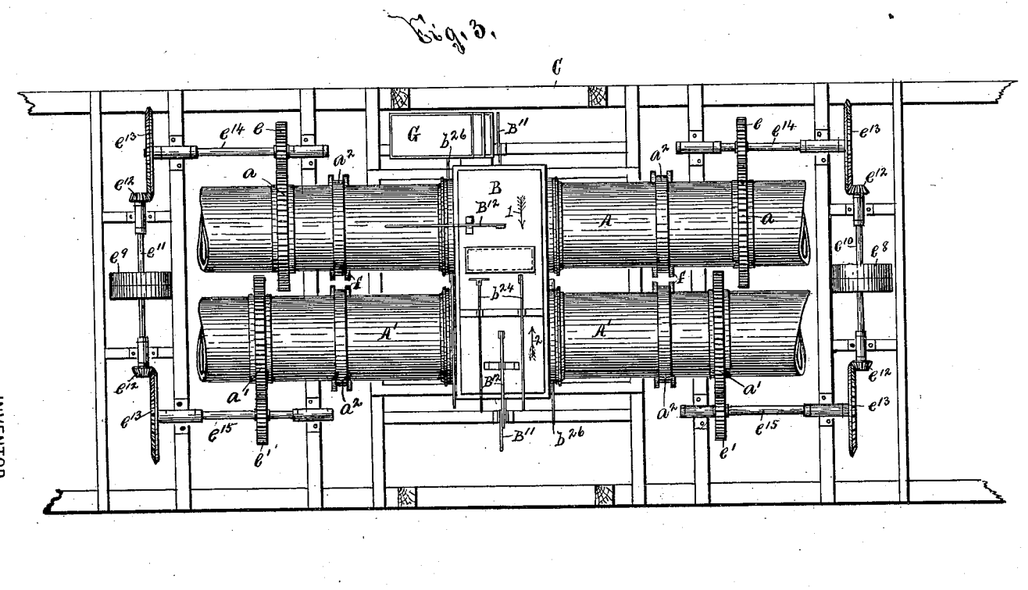
Fig. 2 is an enlarged elevation of the contiguous ends of two adjacent pairs of the conveyer elements of my apparatus—an elevator for feeding material to the casing connecting said conveyer elements, driving mechanism for revolving the conveyer elements, and the frame for supporting said conveyer elements, elevator, and driving mechanism.
Figure 4:
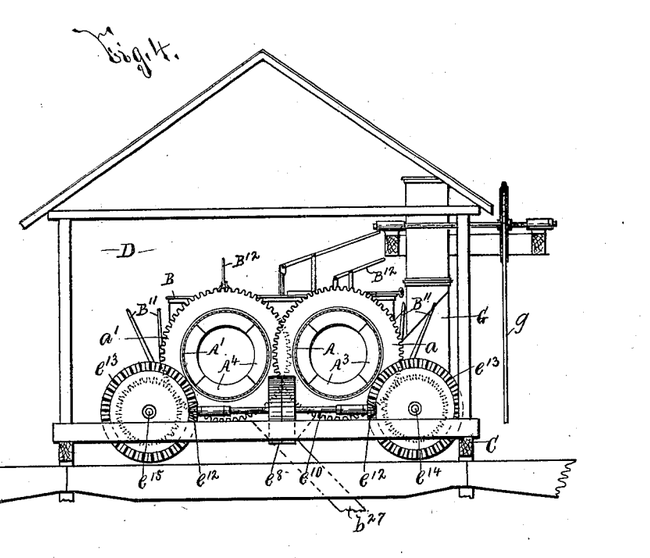
Figs. 4 and 5 are transverse vertical sections taken, respectively, on lines 4 4 and 5 5, Fig. 1, the cooling-chamber being removed in Fig. 5.
Figure 5:
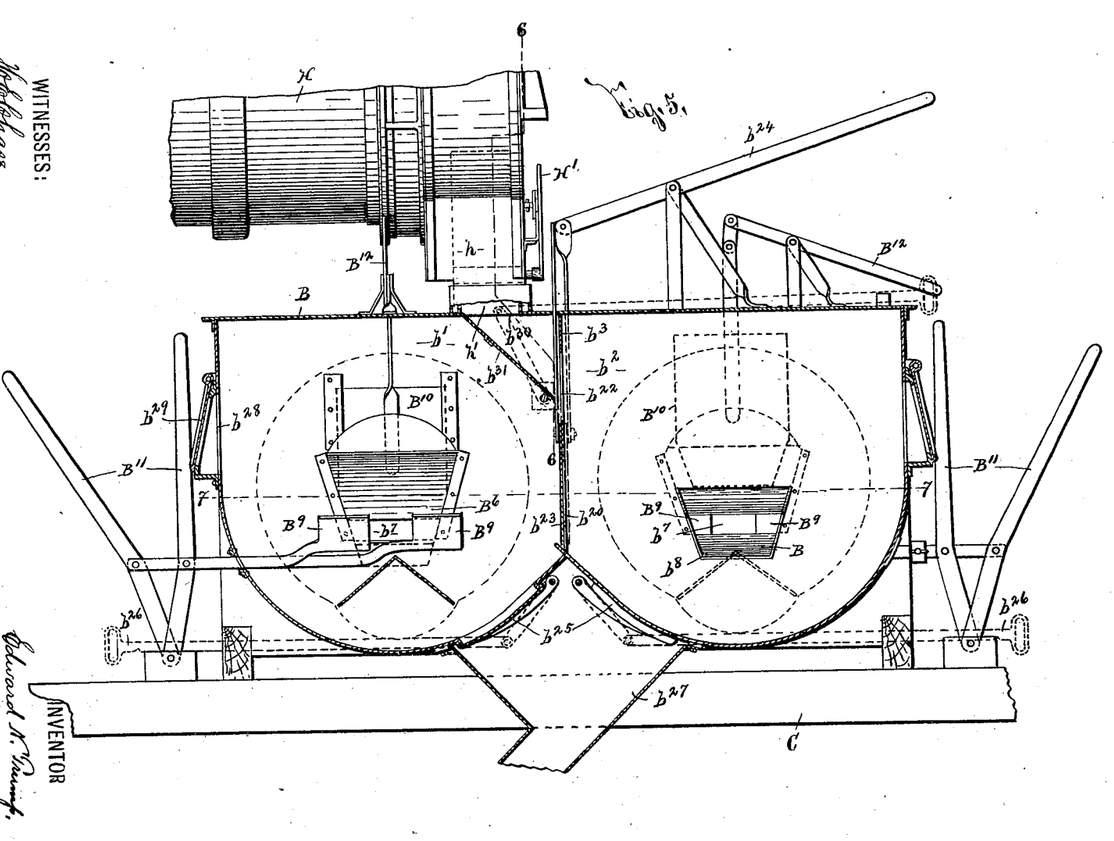
Figure 6:
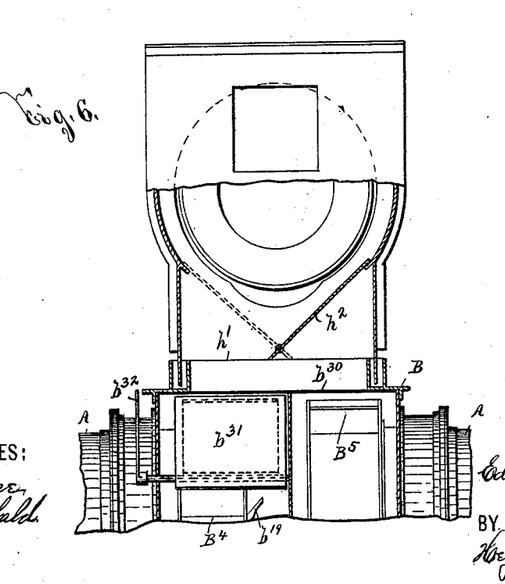
Figs. 6 and 7 are transverse vertical and longitudinal horizontal sections taken, respectively, on lines 6 6 and 7 7, Fig. 5.

The material to be conveyed may be inserted within the casings B from an outside source, and I have here illustrated two means for effecting this result, one being best seen in Figs. 2, 3, and 4 and the other in Figs. 5 and 6. The feeding mechanism shown in Figs. 2, 3, and 4 consists of an elevator G, of any desirable construction, unnecessary to herein specifically illustrate and describe, and, if desired, this elevator may be actuated by a belt $g$, connected to the main shaft $e^2$, previously described. As best seen in Fig. 2, the elevator G discharges the material through an inlet $b^{28}$, Fig. 5, in one end of the inclosing wall or shell of the adjacent casing B, whence it is fed onwardly by the pockets or scoops $B^4$ $B^5$ to one of the conveyer elements $A'$. All of the casings B are usually provided with this inlet, even though they are not connected to an elevator G, and when not used this inlet is closed by a suitable closure, as a door or gate $b^{29}$, and may serve as an observation-opening.

The feeding mechanism shown in Figs. 5 and 6 consists of a conveyer element H, which may be of the same construction as the conveyer elements A A' previously described or of any other suitable construction, unnecessary to herein specifically illustrate or describe. This conveyer element is provided with a discharge-chamber $h$, having an outlet $h'$ and a gate $h^2$ for deflecting or directing all or part of the material to either side of said outlet. The inclosing wall or shell of the adjacent casing B is formed with an inlet $b^{30}$ in its upper portion alined with the outlet $h'$, and a suitable gate $b^{31}$ deflects or directs the material through the passage or opening $b^{22}$ of said casing or may be rocked into position to permit all or part of said material to fall downwardly to the base of the casing B, whence it may pass through the adjacent outlet-opening in the base of the casing B or be fed onward by the pockets or scoops $B^4$ $B^5$. These gates are operated by any suitable mechanism, as levers $H'$ $b^{32}$. It is thus apparent that all or part of the material from the conveyer element H may pass through the adjacent casing B and escape from its underlying outlet-opening without being fed through the conveyer elements leading from said casing or may be fed from said casing in opposite directions by the conveyer elements feeding therefrom.

My invention is not limited to any particular arrangement of pockets, and at Fig. 16 I have shown a slightly-modified construction thereof, in which one of the conveyer elements is provided with angularly-arranged pockets $B^{20}$, having their inner sides and their advance ends provided with outlet-openings $B^{21}$ $B^{22}$ and corresponding upright sides formed with openings $B^{23}$ for receiving the material fed by the conveyer-blades $A^{10}$. The pockets $B^{20}$ pick up the material from the base of the casing $B^{24}$ and discharge the same through the openings $B^{21}$ into a chute $B^{25}$. A suitable gate $B^{26}$ may be operated to close the chute $B^{25}$, and in that event the material is discharged from the openings $B^{22}$ in the advance ends of the pockets through an opening in the partition $B^{27}$ and is picked up by pockets $B^{28}$ of the same construction as the pockets $B^5$ previously described.

The construction and operation of my conveying apparatus will be readily understood upon reference to the foregoing description and the accompanying drawings, and, as will be particularly noted, said apparatus is capable of effecting great diversity in the feed and movement of the material to be conveyed, its movable means for transferring the material from one conveyer element to another extending therefrom in a continuous line or arranged parallel therewith is supported directly upon said conveyer elements, thus rendering unnecessary any additional movable cross-feeding mechanism, and said apparatus operates to feed the material in any direction in substantially the same horizontal plane, which is a feature of great advantage and renders the same capable of uses for which it would be unsuitable if incapable of such operation.

The construction and arrangement of this apparatus may be considerably varied without departing from the spirit of my invention, and hence I do not herein specifically limit myself thereto; neither do I limit myself by the term "casing" herein to a part communicating with one or more conveyer elements and inclosing the receiving or discharging ends or portions of said elements, since any part, whether an open or closed chamber or a conduit communicating with one or more conveyer elements, would be included within the terms and spirit of my invention. Moreover, I do not limit my invention to means, as the tires $a^2$ and the rollers $f$, for reducing the friction incidental to the rotation of the conveyer elements or to means, as the helical flanges or shoulders $b^5$, for preventing the escape of material through the openings $b$ in the casings B or to any particular construction of packing-rings B', and with the exception of the packing-rings B', which are claimed herein only in combination with parts of my conveying apparatus forming the subject-matter of this application, I do not claim in this present application any of the parts $a^2 f b^5$ B', since the construction of said parts forms no feature of this invention and is reserved as the subject-matter for a divisional application hereof.

Having thus fully described my invention, what I claim as new, and desire to secure by Letters Patent, is—

1. A conveying apparatus comprising a rotary conveyer element for feeding material, a casing communicating with the conveyer element, and mechanism within the casing for feeding material to the conveyer element, said mechanism being connected to the conveyer element with the casing and being actuated by said conveyer element, substantially as and for the purpose described.

2. A conveying apparatus comprising rotary conveyer elements for feeding material in opposite directions, a casing connecting the conveyer elements, and mechanism within the casing for transferring material from one conveyer element to another, a part of said mechanism being connected to one of the conveyer elements within the casing and being actuated by said one of the conveyer elements, substantially as and for the purpose set forth.

3. A conveying apparatus comprising rotary conveyer elements for feeding material in opposite directions, a casing connecting the conveyer elements and provided with compartments for the conveyer elements and a passage connecting the compartments, and mechanism within the casing for transferring material through said passage from one conveyer element to another, a part of said mechanism being connected to one of the conveyer elements within the casing and being actuated by said one of the conveyer elements, substantially as and for the purpose specified.

4. A conveying apparatus comprising rotary conveyer elements for feeding material in opposite directions, a casing connecting the conveyer elements, mechanism within the casing for transferring material from one conveyer element to another, and means for controlling the operation of the transfer mechanism without varying the rotation of the conveyer elements, substantially as and for the purpose specified.

5. A conveying apparatus comprising rotary conveyer elements for feeding material in opposite directions, a casing connecting the conveyer elements and provided with compartments for the conveyer elements and a passage connecting the compartments, mechanism within the casing for transferring material through said passage from one conveyer element to another, a part of said mechanism being connected to one of the conveyer elements within the casing and being actuated by said one of the conveyer elements, and means for controlling the movement of material through said passage without varying the rotation of the conveyer elements, substantially as described.

6. A conveying apparatus comprising a rotary conveyer element for feeding material, a casing communicating with the conveyer element, and mechanism within the casing for feeding material to the conveyer element, a part of said mechanism being carried by the conveyer element, substantially as described.

7. A conveying apparatus comprising rotary conveyer elements provided with means for feeding material lengthwise of the conveyer elements, a casing connecting the conveyer elements, and mechanism within the casing for transferring material from one conveyer element to another, a part of said mechanism being carried by one of the conveyer elements and actuated thereby, substantially as described 8. A conveying apparatus comprising a pair of rotary conveyer elements for feeding material in opposite directions, a casing connecting the conveyer elements, and mechanism within the casing for transferring material from either conveyer element to the other, substantially as described.

9. A conveying apparatus comprising a pair of rotary conveyer elements for feeding material in opposite directions, mechanism for transferring material from either conveyer element to the other, and means for controlling the operation of the transfer mechanism without varying the rotation of the conveyer elements, substantially as described.

10. A conveying apparatus comprising rotary conveyer elements provided with means for feeding material lengthwise of the conveyer elements, a casing connecting the conveyer elements, and mechanism within the casing for transferring material from one conveyer element to another, said mechanism comprising a chute and means actuated by one of the conveyer elements, substantially as described.

11. A conveying apparatus comprising rotary conveyer elements provided with means for feeding material lengthwise of the conveyer elements, a casing connecting the conveyer elements and provided with compartments for the conveyer elements and a passage connecting the compartments, and mechanism within the casing for transferring material through said passage from one conveyer element to another, said mechanism comprising a chute and means actuated by one of the conveyer elements, substantially as described.

12. A conveying apparatus comprising rotary conveyer elements for feeding material in opposite directions, casings connecting the opposite ends of one conveyer element to the corresponding ends of another conveyer element, and mechanism within the casings for transferring material from the discharging ends of the conveyer elements to the receiving ends of said conveyer elements, substantially as described.

13. A conveying apparatus comprising rotary conveyer elements for feeding material in opposite directions, casings connecting the opposite ends of one conveyer element to the corresponding ends of another conveyer element, and mechanism within the casings for transferring material from one conveyer element to the other, said mechanism comprising a chute and means actuated by the conveyer elements, substantially as described.

14. A conveying apparatus comprising rotary conveyer elements, casings connecting the opposite ends of one conveyer element to the corresponding ends of another conveyer element, said casings being formed with compartments for the conveyer elements and passages connecting the compartments, mechanism within the casings for transferring material from one conveyer element to the other, and means for controlling the movement of material through said passages without varying the rotation of the conveyer elements, substantially as described.

15. A conveying apparatus comprising a pair of rotary conveyer elements for feeding material in the same direction, an additional rotary conveyer element for feeding material in an opposite direction, a casing connecting the conveyer elements, and mechanism within the casing for transferring material from one of said pair of rotary conveyer elements to the other of said pair of rotary conveyer elements or to the additional rotary conveyer element, substantially as described.

16. A conveying apparatus comprising a pair of rotary conveyer elements for feeding material in the same direction, additional rotary conveyer elements for feeding material in an opposite direction, a casing connecting the conveyer elements, and mechanism within the casing for transferring material from one of the conveyer elements to a conveyer element feeding in the same direction as said one of the conveyer elements and for transferring material to a conveyer element feeding in the opposite direction, substantially as described.

17. A conveying apparatus comprising a pair of rotary conveyer elements for feeding material in the same direction, an additional rotary conveyer element for feeding material in an opposite direction, a casing connecting the conveyer elements and provided with compartments for the conveyer elements and passages connecting the compartments, and mechanism within the casing for transferring material through said passages from one of said pair of rotary conveyer elements to the other of said pair of rotary conveyer elements or to the additional rotary conveyer element, substantially as described.

18. A conveying apparatus comprising a pair of rotary conveyer elements for feeding material in the same direction, additional rotary conveyer elements for feeding materal in an opposite direction, a casing connecting the conveyer elements and provided with compartments for the conveyer elements and passages connecting the compartments, and mechanism within the casing for transferring material from one of the conveyer elements to a conveyer element feeding in the same direction as said one of the conveyer elements and for transferring material to a conveyer element feeding in the opposite direction, substantially as described.

19. A conveying apparatus comprising a pair of rotary conveyer elements arranged end to end for feeding material lengthwise of the conveyer elements in one direction, additional rotary conveyer elements arranged end to end and substantially parallel with the former conveyer elements for feeding material lengthwise of the conveyer elements in the opposite direction, and mechanism for transferring material from one of the conveyer elements to a conveyer element feeding in the same direction as said one of the conveyer elements and arranged end to end therewith, and for transferring material from said one of the conveyer elements to a conveyer element feeding in the opposite direction, substantially as described.

20. A conveying apparatus comprising rotary conveyer elements arranged end to end and provided with means for feeding material lengthwise of the conveyer elements in one direction, additional rotary conveyer elements arranged end to end and substantially parallel with the former conveyer elements and provided with means for feeding material lengthwise of the conveyer elements in the opposite direction, a casing connecting the conveyer elements and provided with compartments for the conveyer elements and passages connecting the compartments, mechanism within the casing for transferring material from one of the conveyer elements to a conveyer element feeding in the same direction as said one of the conveyer elements and arranged end to end therewith, and for transferring material from said one of the conveyer elements to a conveyer element feeding in the opposite direction, substantially as described.

21. In a conveying apparatus, a series of rotary conveyer elements having the receiving end of one element disposed adjacent to the discharging end of another element, a second series of rotary conveyer elements similar to the first series and disposed substantially parallel with said first series, and means connecting the receiving and discharging ends of two like conveyer elements of both series and providing for the transfer of the material from a conveyer element of the first series to a second conveyer element of said first series, or from a conveyer element of the first series to a conveyer element of the second series, substantially as described.

22. A conveying-machine comprising a series of revoluble cylindrical sections, each of which is provided with a plurality of internally-arranged spiral conveyer-blades, said sections being arranged longitudinally and transversely in pairs with a receiving end of one station adjacent to the discharging end of another section, said receiving and discharging ends being and operating substantially as described, and a casing surrounding the adjacent ends of said sections, and provided with partitions having controllable openings therein, and means whereby the course of the material may be controlled in the manner set forth.

23. A conveying apparatus, comprising in its organization conveyer elements for receiving material to be conveyed, means for rotating the conveyer elements, means for feeding material lengthwise of the conveyer elements in opposite directions, a plurality of casings connecting the conveyer elements at intervals, and mechanism within each of the casings for transferring material from one of the conveyer elements to another of said elements, substantially as described.

24. A conveying apparatus, comprising in its organization conveyer elements for receiving material to be conveyed, means for rotating the conveyer elements, means for feeding material lengthwise of the conveyer elements in opposite directions, a plurality of casings connecting the conveyer elements at intervals and provided with compartments for the conveyer elements and passages connecting the compartments, and mechanism within each of the casings for transferring material from one of the conveyer elements to another of said elements, substantially as described.

25. A conveying apparatus comprising a rotary conveyer element for feeding material, a casing communicating with the conveyer element, and a pocket or scoop secured to the periphery of the conveyer element within the casing for feeding material, substantially as described.

26. In a conveying apparatus, the combination of a rotary conveyer element for feeding material, said conveyer element being formed with an opening in its outer wall, a casing communicating with the conveyer element, and a pocket or scoop secured to the periphery of the conveyer element provided with the opening in its wall for feeding material into said opening, substantially as described.

27. In a conveying apparatus, the combination of a rotary conveyer element for feeding material, a casing communicating with the conveyer element, and means, as a pocket or scoop, secured to the periphery of the conveyer element within the casing and formed with a discharging-opening in its advance end, substantially as described.

28. In a conveying apparatus, the combination of a rotary conveyer element for feeding material, a casing communicating with the conveyer element and provided with compartments and a passage connecting the compartments, and means secured to the periphery of the conveyer element within one of the compartments for feeding material through the passage, substantially as described.

29. In a conveying apparatus, the combination of rotary conveyer elements for feeding material, said conveyer elements being arranged substantially side by side, means, as a pocket or scoop, secured to the periphery of one conveyer element and discharging into the interior thereof, and means, as a pocket or scoop, secured to the periphery of another conveyer element and discharging to the former means, substantially as described.

30. In a conveying apparatus, the combination of rotary conveyer elements for feeding material, one of the conveyer elements being formed with an opening in its wall and with means secured to its periphery for feeding material into said opening, and means, as a pocket or scoop, secured to the periphery of another of the conveyer elements and formed with a discharging-opening in its advance end, substantially as described.

31. In a conveying apparatus, the combination of rotary conveyer elements for feeding material, one of the conveyer elements being formed with an opening in its wall, a casing connecting the conveyer elements and provided with compartments for the conveyer elements and a passage connecting the compartments, means secured to the conveyer element provided with the opening in its wall for feeding material into said opening, and means secured to another of the conveyer elements for feeding material through the passage, substantially as described.

32. In a conveying apparatus, the combination of a rotary conveyer element provided with a pocket or scoop for feeding material, a casing communicating with the conveyer element, and means projecting from the conveyer element within the casing for feeding material into the pocket or scoop, substantially as described.

33. In a conveying apparatus, the combination of a rotary conveyer element, a casing communicating with the conveyer element and provided with compartments and a passage connecting the compartments, means, as a pocket or scoop, secured to the periphery of the conveyer element within one of the compartments for feeding material through the passage, said pocket or scoop being provided with means projecting therefrom for feeding material into the pocket or scoop, substantially as described.

34. In a conveying apparatus, the combination of rotary conveyer elements for feeding material, means, as a pocket or scoop, secured to the periphery of one conveyer element and discharging into the interior thereof, a second means, as a pocket or scoop, secured to the periphery of another conveyer element and discharging to the former means, and a third means, projecting from one of the conveyer elements and feeding material to said second means, substantially as described.

35. A rotary conveyer element provided with means for feeding material lengthwise of the conveyer element and provided at its discharging end with internal pockets for receiving the material fed by said means and for automatically discharging the material as the conveyer element is rotated, a second rotary conveyer element having its receiving end disposed adjacent to the discharging end of the first conveyer element, and means for transferring the material discharged from the pockets of the first conveyer element to the second conveyer element, a part of said means projecting within the discharging end of the first conveyer element beneath the point of discharge of the internal pockets for receiving the material as it falls from said pockets, substantially as described.

36. In a conveying apparatus, a series of rotary conveyer elements having the receiving end of one conveyer element disposed adjacent to the discharging end of another conveyer element, each of said elements being provided with internal spiral conveyer-blades and having at its discharging end internal pockets receiving the material from said blades, a second series of rotary conveyer elements similar to the first series and disposed substantially parallel to said first series, and means connecting the receiving and discharging ends of two like conveyer elements of both series and thereby providing for the transfer of the material from a conveyer element of the first series to a second conveyer element of said first series or from a conveyer element of the first series to a conveyer element of the second series, substantially as described.

37. In a conveying apparatus, the combination of a rotary conveyer element, feeding means, as a pocket, within the conveyer element and actuated by said conveyer element, and additional feeding means, as a pocket or scoop, secured to the periphery of the conveyer element, substantially as described.

38. In a conveying-machine, the combination of a revoluble cylinder provided with interior spirally-arranged conveyer-blades, interior pockets located at the end of the cylinder at the terminus of said blades, exterior pockets at said end, and a casing inclosing the end.

39. In a conveying apparatus, the combination of a rotary conveyer element for feeding material, a pocket or scoop secured to the periphery of the conveyer element, and a chute for discharging material to said pocket or scoop, substantially as described.

40. In a conveying apparatus, the combination of a rotary conveyer element for feeding material lengthwise of said element, a chute, and means, as a pocket, for receiving the material fed by the conveyer element, said means being secured to the conveyer element and discharging into the chute, substantially as described.

41. In a conveying-machine, the combination of a rotary conveyer having in its interior a plurality of spirally-arranged conveyer-blades, and at the termination of said blades a series of tangentially-arranged receiving and discharging pockets communicating with the space between two blades, and a chute the mouth of which is adjacent to said pockets for the purpose set forth.

42. In a conveying-machine, the combination of a rotary cylinder having on its interior a plurality of spirally-arranged conveyer-blades, two flanges at the end of said cylinder, the inner one of which is perforated at its juncture with the terminating blades, pockets located between said flanges and at said perforations, the outer flange having an annular opening, and a chute the mouth of which projects through said latter opening to the inner flange.

43. In a conveying apparatus, the combination of a rotary conveyer element for feeding material, feeding means, as a pocket or scoop, secured to the periphery of the conveyer element, a chute for discharging material to said feeding means, and feeding means, as a pocket, within the conveyer element for discharging into the chute, substantially as described.

44. In a conveying apparatus, the combination of rotary conveyer elements for feeding material, a chute for conducting material to one conveyer element, and feeding means, as a pocket, secured to another conveyer element and discharging into the chute, substantially as described.

45. In a conveying apparatus, the combination of rotary conveyer elements for feeding material, means, as a pocket or scoop, secured to the periphery of one conveyer element and discharging into the interior thereof, means, as a pocket or scoop, secured to the periphery of another conveyer element and discharging to the former means, a chute for discharging material toward said second means, and means, as a pocket, secured to one of said conveyer elements and discharging into the chute, substantially as described.

46. In a conveying-machine, the combination, with a rotary conveyer having a discharge end provided with pockets communicating with the interior, of a second conveyer in alinement therewith and having a receiving end provided with scoops leading to the interior, and a casing inclosing said ends and having a partition, and a chute having one end adjacent to the pockets in the discharging end, and having its other end projecting through the partition into the receiving end.

47. In a conveying-machine the combination with a rotary cylinder having conveying-blades and a discharging end provided with discharging-pockets, a second rotary conveyer having conveying-blades and a receiving end provided with scoops leading to the interior, a fixed casing inclosing the ends of both conveyers and provided with a partition separating said ends, and a chute passed through said partition to provide a communication between the conveyers, having controllable openings.

48. In a conveying apparatus, the combination of a rotary conveyer element, a chute provided with an outlet for conducting material to the conveyer element, and a second outlet for conducting material away from the conveyer element, closures for said outlets, and a conveyer element for feeding material to the chute, substantially as described.

49. In a conveying apparatus, the combination of a rotary conveyer element, a casing communicating with the conveyer element and provided with compartments and a passage connecting the compartments, a chute for conducting material through the passage, and means secured to the conveyer element for feeding material into the chute, substantially as described.

50. In a conveying apparatus, the combination of rotary conveyer elements, a casing connecting the conveyer elements and provided with compartments for the conveyer elements and a passage connecting the compartments, a chute discharging through the passage connecting the compartments to one of the conveyer elements, and means carried by the other conveyer element for feeding material into the chute, substantially as described.

51. In a conveying apparatus, the combination of rotary conveyer elements for conveying material, one of the conveyer elements being provided with means, as a pocket, on its interior, a chute for receiving material discharged from the pocket, means, as a pocket or scoop on the exterior of one of the conveyer elements for feeding material, and means carried by one of the conveyer elements for feeding into said exterior pocket or scoop material discharged from the chute, substantially as described.

52. In a conveying apparatus, the combination of rotary conveyer elements, a casing connecting the conveyer elements and provided with compartments for the conveyer elements and a passage connecting the compartments, a chute for conducting material through the passage, said chute being provided with an outlet discharging into one of the conveyer elements and a second outlet discharging into the casing, closures for the outlets, means carried by the other conveyer element for feeding material into the chute, and additional means carried by said other conveyer element for feeding material discharged by the chute into the casing, substantially as described.

53. A conveying-machine comprising a rotary conveyer having a discharging end provided with internal and external pockets, the latter having projections, a second conveyer in alinement therewith having a receiving end provided with scoops leading to the interior, a third conveyer in parallelism with the first conveyer and having a receiving end in transverse alinement with the discharging end of the first conveyer, said receiving end being provided with scoops leading to the interior, a fourth conveyer in alinement with the third conveyer having a discharging end provided with internal and external pockets, the latter having projections, and a casing surrounding said ends having a vertical longitudinal partition provided with an opening controlled by a closure, and vertical transverse partitions, and chutes passed through said transverse partitions, each of said chutes being provided with a funnel-mouth adjacent to a discharging end and with its other end projecting into a receiving end, and provided with a closure for the main opening, and with an opening in its lower side controlled by a closure, all substantially as and for the purposes set forth.

54. In a conveying-machine, the combination with a cylinder capable of revolution having internal spirally-arranged conveyer-blades and openings in its side each communicating with a channel or space between two blades, external scoops one for each opening, a fixed casing surrounding that portion of the cylinder having the openings and scoops, having an opening controlled by a closure, annular flanges on the cylinder beyond the casing, and dust-proof rings interposed between said annular flanges and the sides of the casing to provide a dust-proof connection.

55. A conveying apparatus comprising a pair of rotary conveyer elements for feeding material in opposite directions, a casing connecting the conveyer elements and provided with openings for receiving said conveyer elements and with chambers or stuffing-boxes projecting from said openings, mechanism within the casing for transferring material from either conveyer element to the other, and packing-rings arranged within the chambers or stuffing-boxes between contiguous surfaces of the conveyer elements and said chambers or stuffing-boxes, substantially as described.

56. A conveying apparatus comprising a rotary conveyer element for feeding material, a casing communicating with the conveyer element, mechanism within the casing for feeding material to the conveyer element, said mechanism being connected to the conveyer element within the casing and being actuated by said conveyer element, an additional conveyer element discharging into the casing, and means for causing the material discharged by the additional conveyer element to pass to said mechanism or to pass from the casing without being fed by said mechanism, substantially as described.

57. In a conveying apparatus, the combination of a casing, a plurality of conveyer elements communicating with the casing, mechanism within the casing for transferring material from one conveyer element to another, an additional conveyer element discharging into the casing, and means for causing the material discharged by the additional conveyer element to pass to said transfer mechanism or to pass from the casing without being fed by said transfer mechanism, substantially as described.

58. In a conveying apparatus, the combination of a casing having openings in its upright, lower and upper portions, a plurality of conveyer elements inserted into the openings in the upright portion of the casing, mechanism within the casing for transferring material from one conveyer element to another, an additional conveyer element for discharging material through the opening in the upper portion of the casing; and means for causing the material discharged by the additional conveyer element to pass to said transfer mechanism or to escape through the opening in the lower portion of the casing without being fed by said transfer mechanism, substantially as described.

In testimony whereof I have hereunto signed my name in the presence of two attesting witnesses, at Syracuse, in the county of Onondaga, in the State of New York, this 11th day of January, 1896.

EDWARD NEEDLES TRUMP.

Witnesses:
  E. A. WEISBURG,
  K. H. THEOBALD.